United States Patent [19]

Goth

[11] 4,444,408
[45] Apr. 24, 1984

[54] SWINGING LINK MECHANISM

[75] Inventor: John Goth, Guildford, Australia

[73] Assignee: James Goth, New South Wales, Australia

[21] Appl. No.: 362,165

[22] Filed: Mar. 26, 1982

[30] Foreign Application Priority Data

Jun. 1, 1981 [AU] Australia .............. PE9116

[51] Int. Cl.$^3$ ............................................. B62D 53/08
[52] U.S. Cl. .............................. 280/438 A; 280/433; 280/439; 280/492
[58] Field of Search ............... 280/438 R, 438 A, 439, 280/492, 433

[56] References Cited

U.S. PATENT DOCUMENTS

| 1,380,490 | 6/1920 | Masury | 280/439 |
|---|---|---|---|
| 1,866,055 | 7/1932 | Reid | 280/439 |
| 3,869,147 | 3/1975 | Fry | 280/438 R |
| 4,199,168 | 4/1980 | Bush et al. | 280/439 |

Primary Examiner—Joseph F. Peters, Jr.
Assistant Examiner—Kenneth R. Rice
Attorney, Agent, or Firm—Kirschstein, Kirschstein, Ottinger & Israel

[57] ABSTRACT

A swinging link mechanism for connecting a prime mover to a rigid trailer comprises an upper and lower opposed pairs of laterally spaced mountings, the lower pair for attachment to the prime mover and the upper pair for connection to the trailer. A swinging link pivotally connects each respective two opposed mountings. The two links are inclined toward one another. The spacing of the lower pair of mountings to be attached to the prime mover exceeds the spacing of the upper pair to be connected to the trailer. The mechanism is particularly for semi-articulated tankers and allows for twisting of the semi-trailer relative to the prime mover.

8 Claims, 6 Drawing Figures

SWINGING LINK MECHANISM

FIELD OF THE INVENTION

This invention relates to a swinging link mechanism for a turntable which connects a rigid trailer or semi-trailer to a rigid prime mover or truck chassis for allowing some degree of twist between the truck chassis and the trailer chassis.

The invention is equally applicable to full self-supporting trailers and to semi-trailers wherein the prime-mover supports part of the trailer.

BACKGROUND OF THE INVENTION

Various types of turntable connections have been derived with some allowing more twist than others. In the attached drawings FIGS. 4, 5 and 6 illustrate prior art arrangements. Broadly speaking they can be separated into three types:

(A) Single oscillating turntables as shown in FIG. 4 allow the truck chassis to change angle with the trailer chassis along the longitudinal dirction (i.e. around a lateral axis) to cope with crests and hollows, but do not allow any sideways twisting in the lateral direction (i.e. around a longitudinal axis) to cope with changes in road camber or potholes.

(B) Double oscillating turntables as shown in FIG. 5 allow the truck and trailer chassis to twist both longitudinally and laterally at the same time. With double oscillating turntables the amount of lateral twist has to be restricted because the truck chassis offers no resistance to the trailer rolling sideways during cornering. While a double oscillating turntable works satisfactorily with trailers having a low centre of gravity it is not suitable for trailers with higher centres of gravity because as the trailer rolls in relation to the truck, the centre of gravity moves in the direction of the twist and makes the vehicle more unstable.

The problem is compounded in the case of a tank-trailer (e.g. a petrol tanker) since the trailer itself is essentially rigid and its chassis cannot twist to accommodate uneven road surfaces.

(C) A number of turntable designs have been developed to allow restricted lateral twist. One of the better types is known as a "kompensator" sliding turntable (see FIG. 6) and allows the turntable feet to slide sideways along an arc with a radius approximately equal to the distance from the centre of gravity of the trailer to the feet so that the trailer effectively twists about its centre of gravity without moving laterally in the direction of roll. This allows the trailer to twist with a limited degree of independence from the prime mover without leading to instability when cornering. The kompensator principle is at present a widely used type of turntable for semi-trailer tanker applications.

A disadvantage of the kompensator principle is that it relies on slides to carry the full weight of the trailer whilst sliding sideways along a cradle, thus creating friction and wearing both the slides and the cradle. This leads to excessive wear in the slides which then tend to stick and in some cases break apart so allowing the trailer to break away from the prime mover. A second disadvantage is that during cornering the tanker twisting about its axis creates a momentum which is passed onto the prime mover when the trailer reaches the limit of its freedom to twist (i.e. a bump-stop).

It is an object of the present invention to mitigate these disadvantages.

SUMMARY OF THE INVENTION

The present invention provides a swinging link mechanism for longitudinally connecting a trailer to a prime mover which comprises:

a first pair of laterally spaced mountings for attachment to the prime mover, a second pair of laterally spaced mountings for connection to the trailer and disposed opposite said first pair of mountings, and a swinging link pivotally attached to and connecting each two opposed mountings such as to allow relative swinging motion of said first and second pairs of mountings along said lateral direction;

the spacing of said first pair of mountings exceeding the spacing of said second pair of mountings such that said two swinging links are inclined towards one another.

Thus, the swinging links allow lateral twisting of the trailer relative to the prime mover in response to road irregularities. Moreover, during cornering centrifugal force exerted on the trailer forces the trailer outwards relative to the prime mover due to swinging action of the links, but at the same time the second pair of mountings attached to the trailer are tilted so as to twist the trailer around a longitudinal axis and to minimise net lateral movement.

The amount of tilt of the second pair of mountings relative to the first pair is determined both by the length of the two swinging links and by their angle of inclination toward one another. In general, it is prefered that each link makes an angle of between 30° and 80° to the lateral direction, preferably 60° to 70°, in the rest position of the mechanism.

It is particularly advantageous if the length and angles of the links are arranged such that the tilting movement of the second pair of mountings occurs in an arc around the centre of gravity of the trailer, (usually considered for a fully laden trailer) such that no lateral shifting of the centre of gravity relative to the axles of the prime-mover occurs when the trailer tilts.

In certain circumstances means will be provided for resiliently resisting movement of the second pair of mountings away from the rest position. Thus, suitable spring means may be provided tending to restore the second pair of mountings to the rest position.

Such spring means is not essential to the working of the mechanism since the links will return to the rest position whenever the prime-mover and trailer are standing on level ground.

If required, a damper may be used to damp the twisting of the trailer so as to minimise any tendency to uncontrolled oscillation.

However, it has been found in practice that the resistance of the mechanism to the twisting movement increases progressively up to the maximum twist determined by the length and rest angle of the swinging links. The action of the links provides that as the maximum twist is reached during cornering, the twisting momentum developed by the roll of the trailer is taken up gradually. In contrast, the maximum degree of twist of the prior-art kompensator arrangement is controlled by bump stops, and the shock transfer of momentum to the prime-mover as the bump stop is reached can lead to steering problems.

Normally, the swinging link mechanism will be entirely carried by the prime mover, and the second pair of mountings may be attached to a turntable top to which the trailer is connected. It is normal practice to provide a turntable ring to allow the prime mover to turn relative to the trailer. Usually, the turntable ring comprises a ball-race, the stationary part of which is attached to the prime mover and the movable portion of which is attached to the first pair of mountings. Thus, the swinging link mechanism of the present invention is conveniently interposed between the turntable top and the bottom turntable ring.

Alternatively, the mechanism may be mounted wholly on the trailer, for example between the trailer body and the skid plate (i.e. the plate which slides onto the turntable top when the trailer is coupled to the prime mover).

Generally, the swinging link mechanism will also be provided with means allowing longitudinal twisting movement (i.e. twisting around the lateral axis). Thus, either pair of mountings may also be pivotally mounted in a direction at right angles to the direction of pivoting of the swinging links.

The pivotal connecting points are generally constituted by any of those pivots known in the art to allow for hinge-type movement through a two-dimensional plane, for example pivot pins mounted in metal or elastomeric sleeves. Such pivot points require little or no maintenance and are reliable in use and not prone to failure. By contrast, the sliding feet of the kompensator sliding turntable are unreliable and prone to wear and failure.

BRIEF DESCRIPTION OF THE DRAWINGS

In the drawings.

FIG. 4 shows a single oscillating turntable arrangement which is capable of twisting only around the lateral axis.

FIG. 5 shows a double oscillating turntable capable of twisting around the longitudinal and lateral axis, and FIG. 6 shows a kompensator slide turntable wherein feet A slide sideways along an arcuate cradle B.

Figure 1:
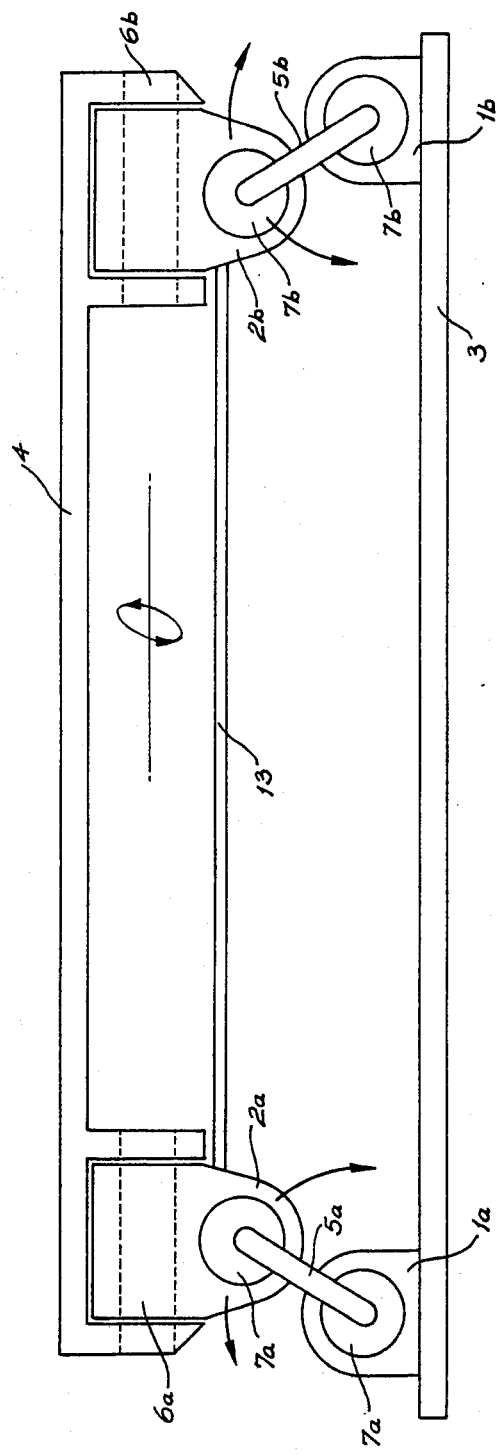
Figure 2:
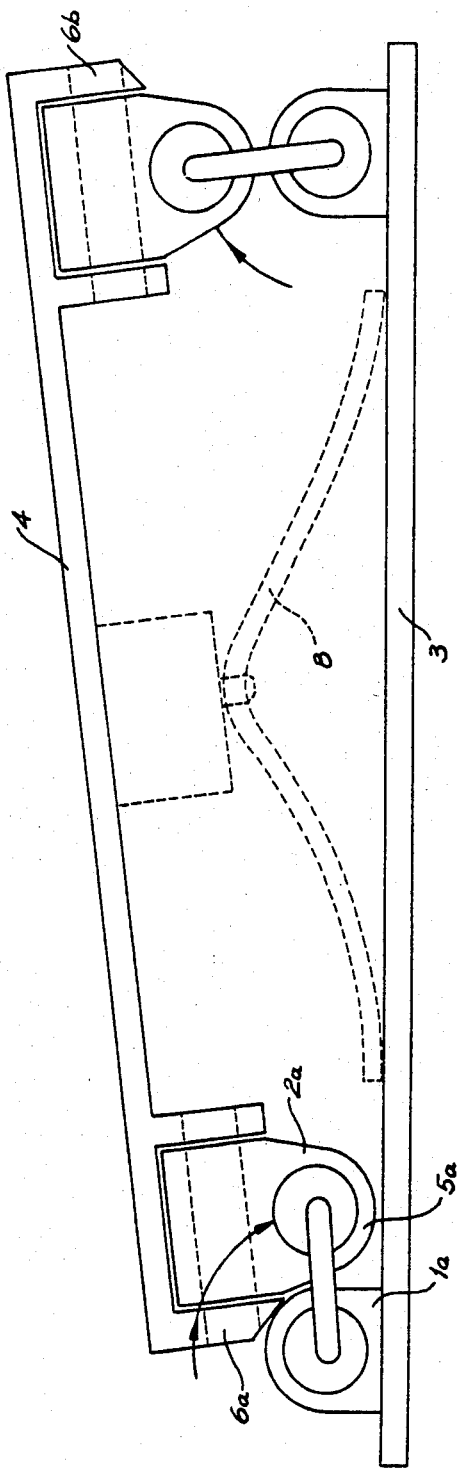
Figure 3:
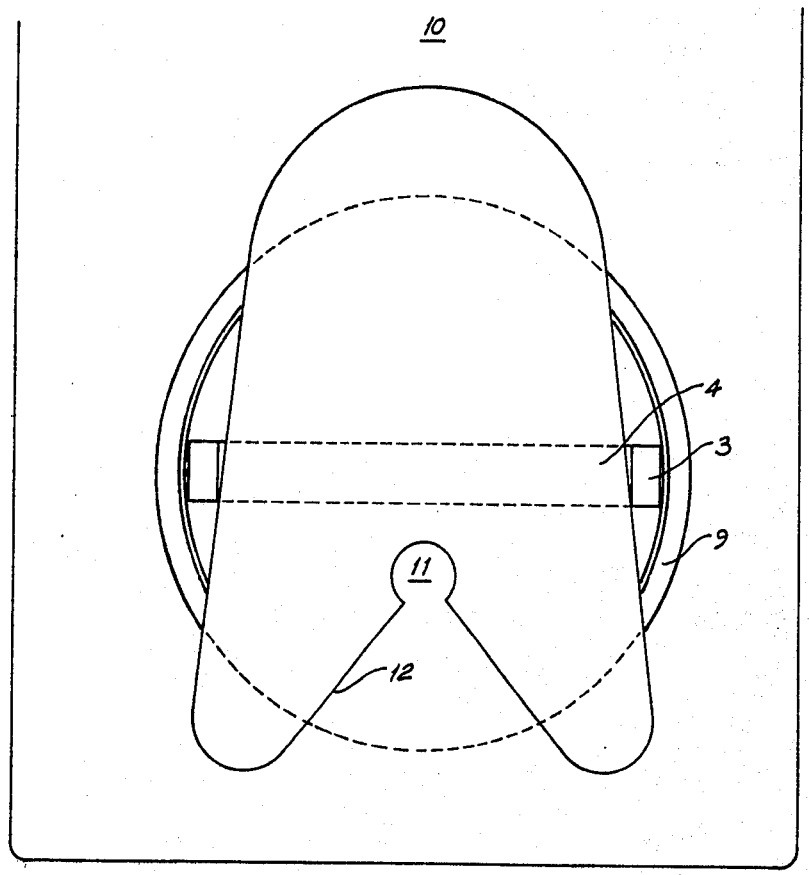
Figure 4:
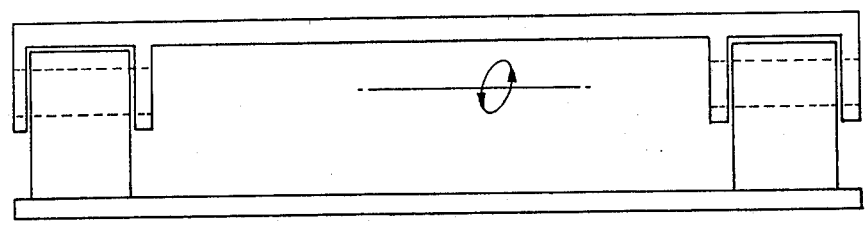
FIGS. 4, 5 and 6 illustrate prior art arrangements, as follows.
Figure 5:
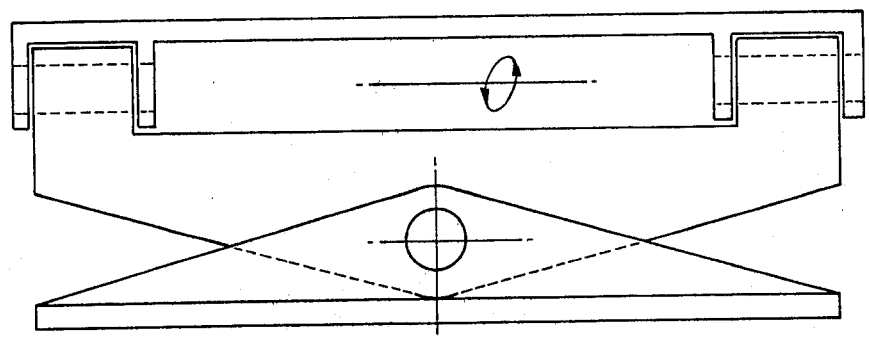
Figure 6:
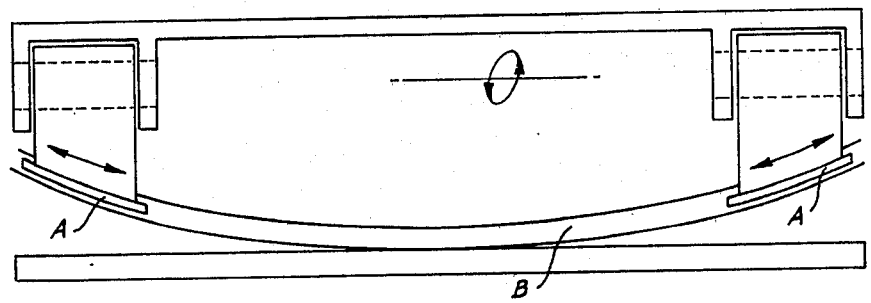

Embodiments of the present invention are shown in FIGS. 1 to 3, wherein:

FIG. 1 is a schematic lateral elevation of a first embodiment in its rest position, FIG. 2 is a lateral elevation of a second embodiment in its fully tilted position, and FIG. 3 is a view from above of the swinging link mechanism when installed on a turntable.

DETAILED DESCRIPTION OF PRIOR ART AND INVENTIVE EMBODIMENTS

The swinging link mechanisms shown in FIGS. 1 and 2 comprise a first pair of laterally spaced mountings 1a and 1b mounted on a bottom turntable ring 3, and a second pair of laterally spaced mountings 2a and 2b pivotally mounted to a turntable top 4 by means of pivot pins 6a and 6b (shown in dotted lines).

Opposed mountings 1a and 2a are interconnected by means of a swinging link 5a. Similarly, opposed mountings 1b and 2b are interconnected by a swinging link 5b. The two ends of the swinging link 5a are connected to pivot pins 7a pivotable within respective bushes provided in the mountings 1a and 2a. Similarly, swinging link 5b is attached to pivot pins 7b. The swinging links 5a and 5b are usually in the form of shackles.

In the embodiment shown in FIG. 1, a bar 13 is attached between respective mountings 2a and 2b. The bar is subject to compression forces and resists inward forces acting on the lower ends of mountings 2a and 2b arising from the inward inclination of links 5a and 5b. This ensures that the respective bushes provided in the mountings 2a and 2b remain parallel to the associated respective pivot pins 6a and 6b and prevents uneven wear on the pins.

In the embodiment shown in FIG. 2, a leaf spring 8 is provided between the turntable top 4 and the turntable ring 3. Such spring is generally not essential. The spring is attached at its mid point to the turntable top and its free ends slidably bear against the ring 3 so as to resist tilting movement of the turntable top 4.

The mechanism in general operates as follows. The rest position is shown in FIG. 1. In this position, the links 5a and 5b are inclined toward each other and each subtends the same angle to a lateral direction. The trailer is connected to the turntable top 4, while the turntable ring 3 is attached to the prime mover. When the vehicle is moving along a straight flat road, the swinging link mechamism adopts the position shown in FIG. 1. Any longitudinal pivoting about the lateral axis is accommodated by swinging of the turntable top around the pivot pins 6a and 6b. When the road is uneven, the swinging links 5a and 5b allow the turntable top 4 and trailer to tilt relative to the prime mover to accommodate road irregularities. A tilted position is shown in FIG. 2. When the vehicle turns a corner, centrifugal force is exerted at the centre of gravity of the trailer and the trailer tends to move sideways. Any sideways movement of the turntable top 4 causes clockwise pivotal movement of the swinging links 5a and 5b about their associated lower pivot pins 7a and 7b against the resistance of the spring 8. The turntable top and associated second mountings 2a and 2b adopt the tilted position shown in FIG. 2. However, the tilting of the trailer ensures that net lateral movement of the centre of the gravity of the trailer is minimized so that instabilities when cornering are avoided.

FIG. 3 shows a view from above of a swinging link mechanism in place on a turntable mounted on the rear of a prime mover 10. The bottom turntable ring 3 is mounted within an outer turntable ring 9 secured to the prime mover. A ball race is interposed between the parts 3 and 9 so that the turntable ring is rotatable within the outer ring 9.

The turntable top 4 is of conventional shape and has a V-shaped cut-out 12 leading to a central aperture 11 for receiving a pin attached to the trailer. The pin is received in the aperture 11 and clamped in place by means of jaws (not shown).

The turntable mechanism thus allows the prime mover to turn relative to the trailer employing the turntable rings 3,9. The turntable top 4 is able to tilt around a lateral axis by means of pivot pins 6a and 6b, and is also able to tilt around a longitudinal axis by means of swinging links 5a and 5b.

The claims defining the invention are as follows:

1. A swinging link mechanism for longitudinally connecting a trailer to a prime mover which comprises:
    a first pair of laterally spaced mountings for attachment to the prime mover,
    a second pair of laterally spaced mountings for connection to the trailer, each mounting of said first pair of mountings being associated with and spaced from a different one of the mountings of said second pair of spaced mountings and together constituting an associated pair of mountings, and a different swinging link pivotally attached to and connecting the opposed mountings of each associated pair of mountings to one another such as to allow relative swinging motion of said first and second pairs of mountings along said lateral direction;

the spacing between said first pair of mountings exceeding the spacing between said second pair of mountings such that said two swinging links are inclined towards one another;

the upper ends of the swinging links being closer together than the lower ends thereof whereby the lateral swinging motion of the second pair of mountings relative to said first pair of mountings takes place around a centre which is spaced above second pair of mountings.

2. A mechanism according to claim 1 wherein a connecting bar rigidly interconnects said second pair of mountings.

3. A mechanism according to claim 1 wherein each mounting of said second pair is pivotally mounted to a member for attachment to the trailer so as to allow pivotal movement about a laterally extending axis.

4. A mechanism according to claim 3 wherein the member is a turntable top, and wherein the mechanism further comprises a bottom turntable ring on which the first pair of mountings are mounted.

5. A mechanism according to claim 2, wherein each link makes an angle of between 30° and 80° to the lateral direction.

6. A mechanism according to claim 1 which further comprises resilient means connected for resiliently opposing swinging motion away from a rest position of the mechanism wherein the links make equal angles to the lateral direction.

7. A mechanism according to claim 1 wherein each link makes an angle of between 60° and 70° to the lateral direction.

8. A prime mover and tanker semi-trailer combination, wherein there is mounted on the prime mover a mechanism according to claim 4.

* * * * *